US006626624B1

United States Patent
Kopperud

(10) Patent No.: US 6,626,624 B1
(45) Date of Patent: Sep. 30, 2003

(54) LATCH MECHANISM FOR TRUCK BED DIVIDER

(75) Inventor: Guy C. Kopperud, Racine, WI (US)

(73) Assignee: Loading Zone LLC, Highland Park, IL (US)

( * ) Notice: Subject to any disclaimer, the term of this patent is extended or adjusted under 35 U.S.C. 154(b) by 0 days.

(21) Appl. No.: 09/838,643

(22) Filed: Apr. 19, 2001

(51) Int. Cl.$^7$ .................................................. B60P 7/14
(52) U.S. Cl. ........................ 410/129; 410/118; 410/151
(58) Field of Search ................................. 410/117, 118, 410/129, 140, 141, 142, 145, 151; 296/37.6; 224/42.33, 42.34, 403; 220/530, 551

(56) References Cited

U.S. PATENT DOCUMENTS

| | | | |
|---|---|---|---|
| 2,411,768 A | * 11/1946 | Welch | 410/151 |
| 2,565,997 A | 8/1951 | Stone | |
| 2,594,208 A | 4/1952 | Pilot | |
| 2,697,631 A | 12/1954 | Miller | |
| 3,090,600 A | * 5/1963 | Smith | 410/151 |
| 3,110,506 A | * 11/1963 | O'Brien | 410/151 |
| 3,782,758 A | 1/1974 | Williamson, II | |
| 4,215,895 A | 8/1980 | Phillips | |
| 4,396,325 A | 8/1983 | Joice-Cavanagh | 410/129 |
| 4,451,075 A | 5/1984 | Canfield | |
| 4,473,331 A | 9/1984 | Wisecarver | 410/129 |
| 4,507,033 A | 3/1985 | Boyd | 410/104 |
| 4,650,383 A | 3/1987 | Hoff | 410/149 |
| 4,720,222 A | * 1/1988 | Nagy et al. | 410/151 |
| 4,733,899 A | 3/1988 | Keys | |
| 4,763,944 A | 8/1988 | Fry et al. | |
| 4,772,165 A | 9/1988 | Bartkus | 410/139 |
| 4,781,498 A | 11/1988 | Cox | 410/118 |
| 4,834,599 A | 5/1989 | Gordon et al. | 410/151 |
| 4,874,028 A | 10/1989 | Lynch et al. | |
| 4,875,730 A | 10/1989 | Justice | |
| 4,934,572 A | 6/1990 | Bowman et al. | |
| 4,961,677 A | 10/1990 | Downard, Jr. | 410/129 |
| 4,986,706 A | * 1/1991 | Williams, Jr. | 410/129 |
| 5,028,185 A | 7/1991 | Shannon | 410/151 |
| 5,090,856 A | 2/1992 | Moore | 410/118 |
| 5,118,156 A | 6/1992 | Richard | |
| 5,147,103 A | 9/1992 | Ducote | |
| 5,207,260 A | 5/1993 | Commesso | |
| 5,253,913 A | 10/1993 | Metivier | |
| 5,265,993 A | 11/1993 | Wayne | 410/129 |
| 5,411,355 A | 5/1995 | Gosnell et al. | 410/139 |
| 5,427,486 A | 6/1995 | Green | 410/118 |
| 5,443,586 A | 8/1995 | Cargill | 410/143 |
| 5,472,301 A | * 12/1995 | Wallen | 410/151 |
| 5,520,314 A | 5/1996 | Tkachuk | |
| 5,533,773 A | 7/1996 | Lessick | |
| 5,542,591 A | 8/1996 | Moore et al. | |

(List continued on next page.)

Primary Examiner—Stephen T. Gordon
(74) Attorney, Agent, or Firm—Boyle, Fredrickson, Newholm, Stein & Gratz, S.C.

(57) ABSTRACT

An adjustable securing latch mechanism for a truck bed divider. The mechanism of the present invention includes a stop engageable with a side wall of a truck bed and an extension member adjustably secured to the truck bed divider. The extension member can be adjusted with respect to the divider in order to accommodate truck beds having various lengths between the side walls. The mechanism may also include a handle pivotally secured to the extension member and pivotally and adjustably secured to the truck bed divider. In this embodiment, the extension member comprises an arm extending from the stop and a link pivotally connected at one end to the arm and to the handle at the opposite end. When the handle is pivoted from an open position to a closed position, the stop via the link and arm is urged outwardly into engagement with the side wall of the truck bed. Further, the handle and the link engage one another to provide an over-center engagement mechanism to prevent any inadvertent disengagement of the adjustable securing mechanism.

14 Claims, 4 Drawing Sheets

U.S. PATENT DOCUMENTS

| | | | |
|---|---|---|---|
| 5,586,850 A | 12/1996 | Johnson | 410/138 |
| 5,685,470 A | 11/1997 | Moore | |
| 5,769,580 A | 6/1998 | Purvis | 410/151 |
| 5,772,370 A | 6/1998 | Moore | 410/100 |
| 5,800,145 A | 9/1998 | Kelce | 410/142 |
| 5,820,187 A | 10/1998 | Ament et al. | |
| 5,845,953 A | 12/1998 | Rusnock | |
| 5,865,580 A | 2/1999 | Lawrence | |
| 5,971,685 A | 10/1999 | Owens | 410/151 |
| 5,975,819 A * | 11/1999 | Cola | 410/129 |
| 6,039,521 A | 3/2000 | Sullivan | 410/118 |
| 6,077,007 A | 6/2000 | Porter et al. | 410/140 |
| 6,089,803 A | 7/2000 | Holland | 410/129 |
| 6,089,804 A | 7/2000 | Bartelt | 410/140 |
| 6,099,222 A | 8/2000 | Moore | 410/100 |
| 6,206,624 B1 * | 3/2001 | Brandenburg | 410/132 |
| 6,419,434 B1 * | 7/2002 | Rahn | 410/151 |

* cited by examiner

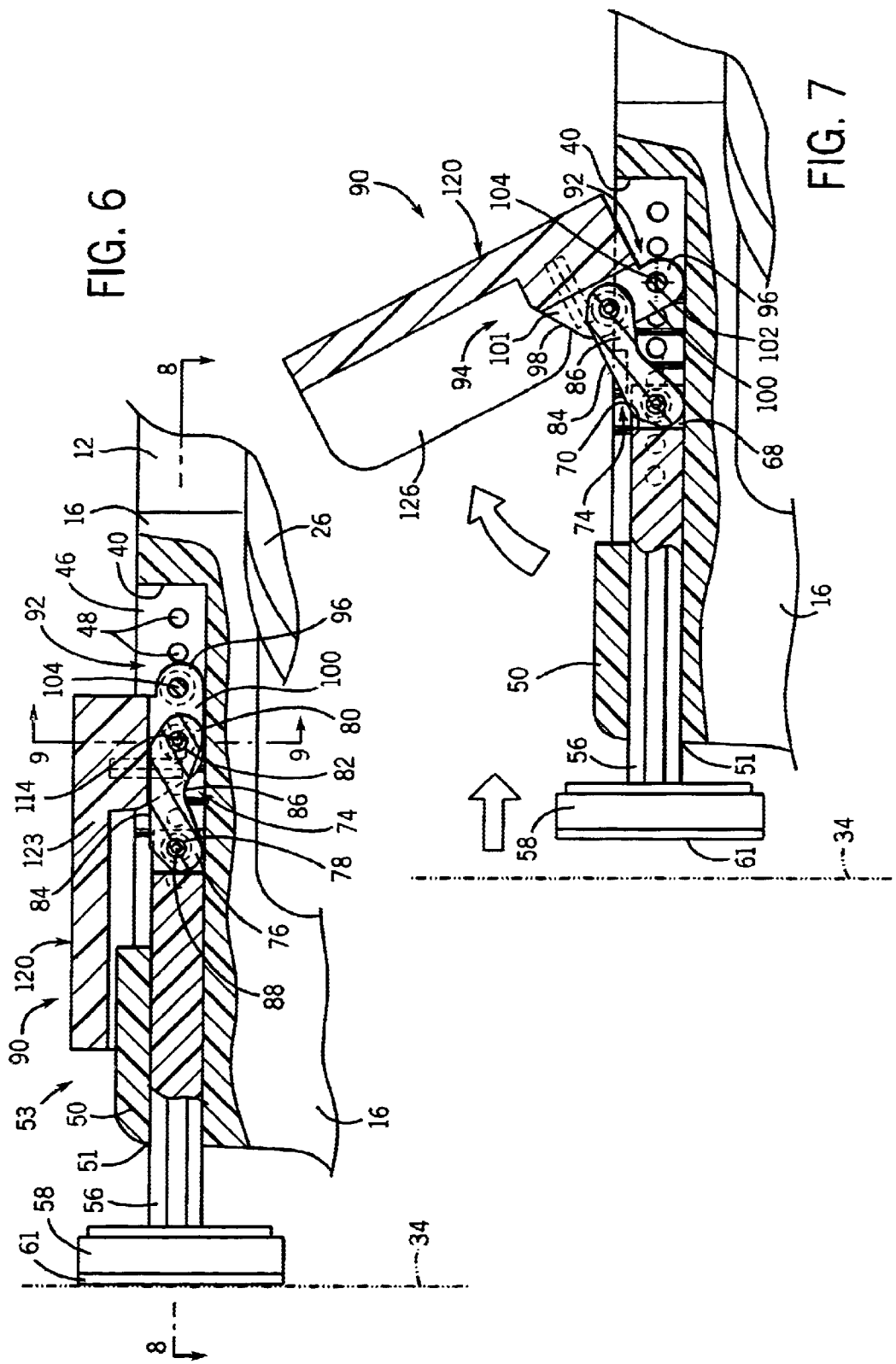

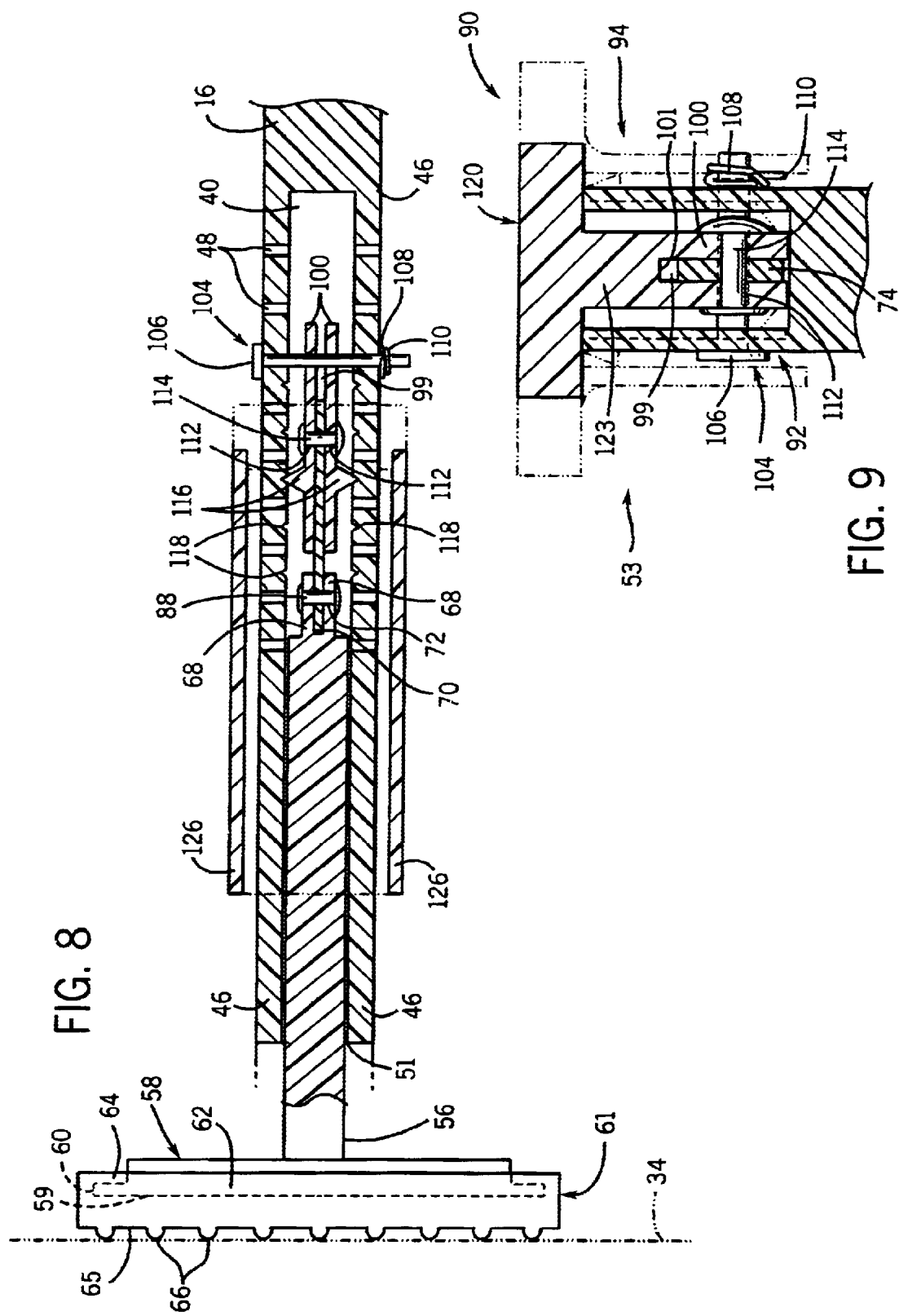

LATCH MECHANISM FOR TRUCK BED DIVIDER

FIELD OF THE INVENTION

The present invention relates to truck bed dividers, and more specifically to an adjustable securing latch mechanism used to retain the divider in a specified position within the truck bed.

BACKGROUND OF THE INVENTION

Pickup trucks are often used to carry items from one place to another. The enclosed bed of the truck allows the items to be retained within the bed while the truck is moving. However, on many occasions, the items that are to be carried in the bed of the truck are not large enough to be securely retained within the truck bed by the walls of the bed without an additional securing structure.

As a result, a number of truck bed dividers have been developed-that segregate the truck bed into sections that conform closely to the size of the items placed in the truck bed to more securely retain the items in the bed. The dividers generally include a rectangular panel or array of panels that extends across the truck bed between the side walls. The divider is secured to the side walls of the truck bed to retain the divider in a stationary position while the truck is moving. The dividers also engage the bottom wall of the truck bed in order to retain the divider in a position perpendicular to the bottom wall while the truck is moving. This prevents the divider from swinging outwardly when contacted by one or more of the items retained by the divider, and allowing those items to slide beneath the divider and possibly out of the truck bed.

Many truck bed dividers have been developed that utilize various configurations for segregating the interior of a truck bed. However, with most of these truck bed dividers, the dividers are designed for the specific dimensions of a truck bed for a particular truck or line of trucks. Therefore, if an individual wishes to purchase a truck bed divider for a truck, that individual must know the exact dimensions of the truck bed, or type of truck with which the divider is to be utilized in order to insure that the truck bed divider fits the truck bed. This is particularly true with respect to the length of the divider and the securing mechanism used to secure the divider between the side walls of the truck bed. If the length of the divider is too short and the securing mechanism cannot reach the side walls, or the divider and securing mechanism cannot fit between the side walls because it is too long, that divider cannot be used with the truck bed.

Therefore, it is desirable to develop a truck bed divider that includes an adjustable securing latch mechanism that is capable of securing the truck bed divider within truck beds having varying lengths between the side walls of the bed.

SUMMARY OF THE INVENTION

It is an object of the present invention to provide an adjustable securing latch mechanism for a truck bed divider that allows the divider to be securely positioned within truck beds having a range of lengths between side walls of the bed.

It is another object of the invention to provide an adjustable securing latch mechanism for a truck bed divider that can be manually engaged and disengaged in a simple operation to releasably secure the divider within the truck bed.

It is still another object of the invention to provide an adjustable securing latch mechanism that can be used on one or both ends of a truck bed divider to further increase the range of truck beds with which the divider can be used.

It is still a further object of the invention to provide an adjustable securing latch mechanism for a truck bed divider that has a simple construction that can be easily incorporated into many existing truck bed divider constructions.

The present invention is an adjustable securing latch mechanism for a truck bed divider. The truck bed divider is formed of a panel including a top rail, a bottom rail, and a pair of side rails connecting the top and bottom rails. The adjustable securing latch mechanism includes an extension member slidably received within one end of one or both of the side rails of the panel. The extension member includes a pad disposed on the member opposite the side rail, and the pad is adapted to releasably engage one of the side walls of the truck bed. Opposite the pad, the extension member is secured to a latch that is pivotably secured to the side rail. The latch is secured to the side rail by a removable bolt extending through one pair of a plurality of pairs of openings positioned along the side rail. The position of the latch on the side rail can be adjusted by removing the bolt, sliding the latch along the side rail to align the opening in the latch with the desired pair of openings in the side rail and reinserting the bolt.

When the latch mechanism is engaged, the extension member and pad are urged outwardly away from the side rail into engagement with one side wall of the truck bed. The pad frictionally contacts the side wall and compresses a second pad disposed on the opposite side rail of the divider against the opposed side wall of the truck bed. The frictional contact of the two pads with the side walls holds the divider between the opposed side walls of the truck bed in order to retain the divider stationary between the side walls.

Various other features, objects and advantages of the invention will be made apparent from the following detailed description taken together with the drawings.

BRIEF DESCRIPTION OF THE DRAWINGS

The following drawings illustrate the best mode currently contemplated of practicing the present invention.

FIG. 6 is a partial cross-sectional view along line 6—6 of FIG. 3, showing the latch mechanism in an engaged position;

FIG. 7 is a cross-sectional view similar to FIG. 6, showing the latch mechanism in a disengaged position;

FIG. 8 is a partial cross-sectional view along line 8—8 of FIG. 6; and

FIG. 9 is a partial cross-sectional view along line 9—9 of FIG. 6.

DETAILED DESCRIPTION OF THE INVENTION

Figure 1:
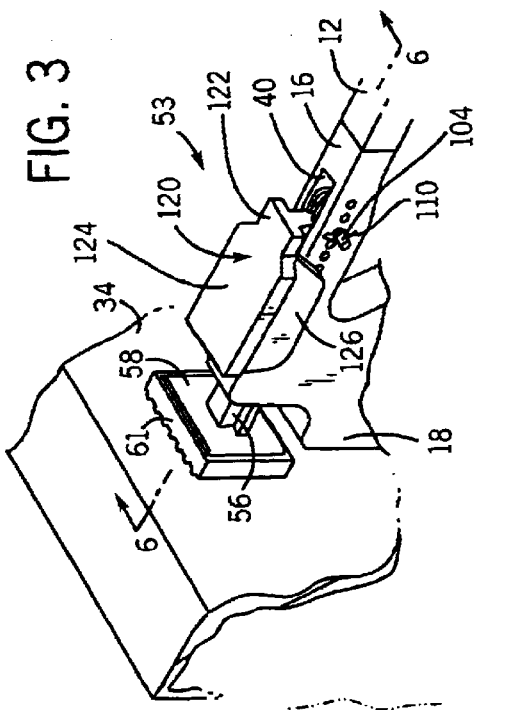
FIG. 1 is an isometric view of a truck bed divider including the adjustable securing latch mechanism of the present invention.
Figure 3:
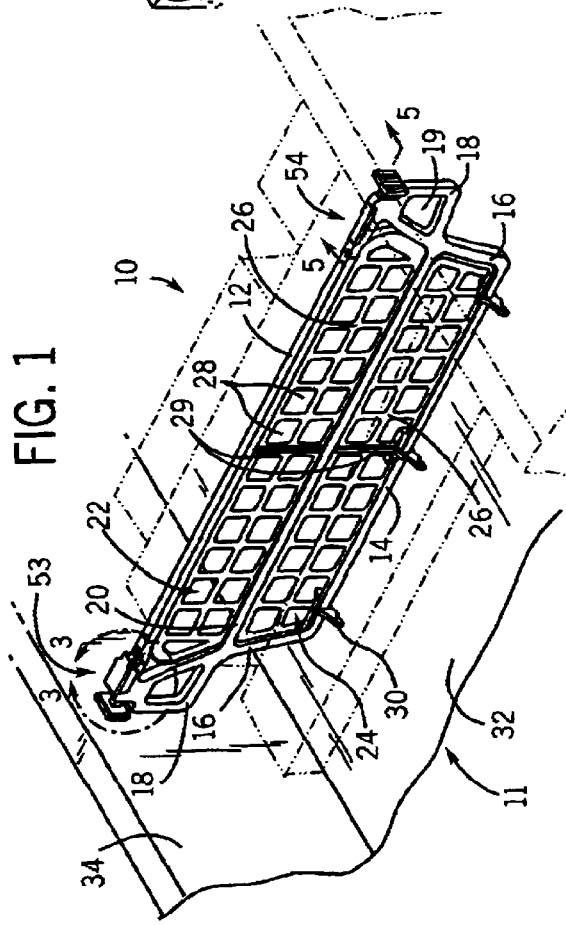
FIG. 3 is an enlarged partial isometric view, with reference to line 3—3 of FIG. 1.
Figure 2:
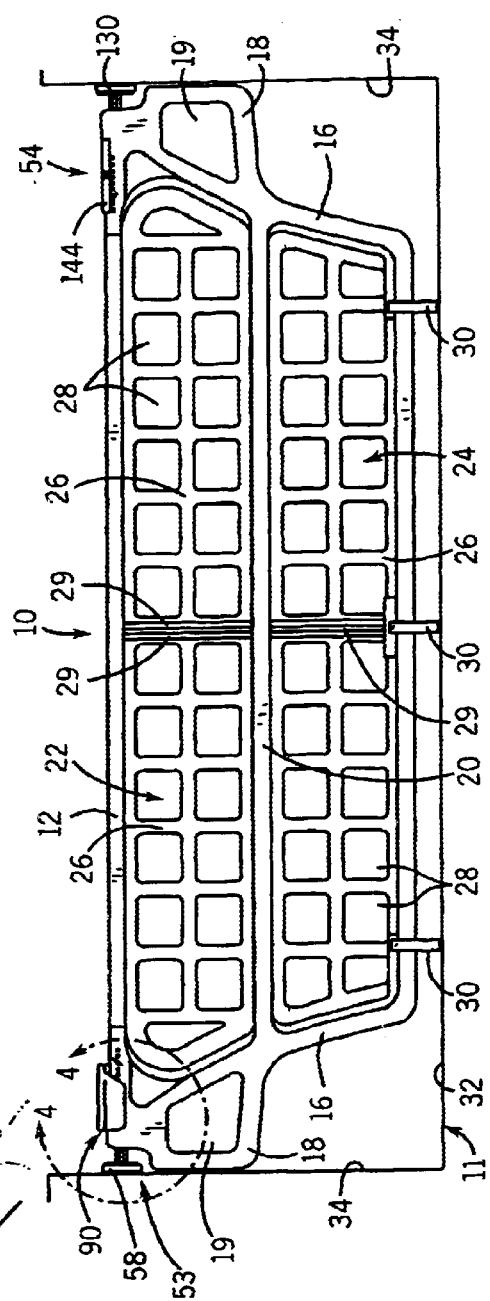
FIG. 2 is a side elevation view of the truck bed divider of FIG. 1.
Figure 4:
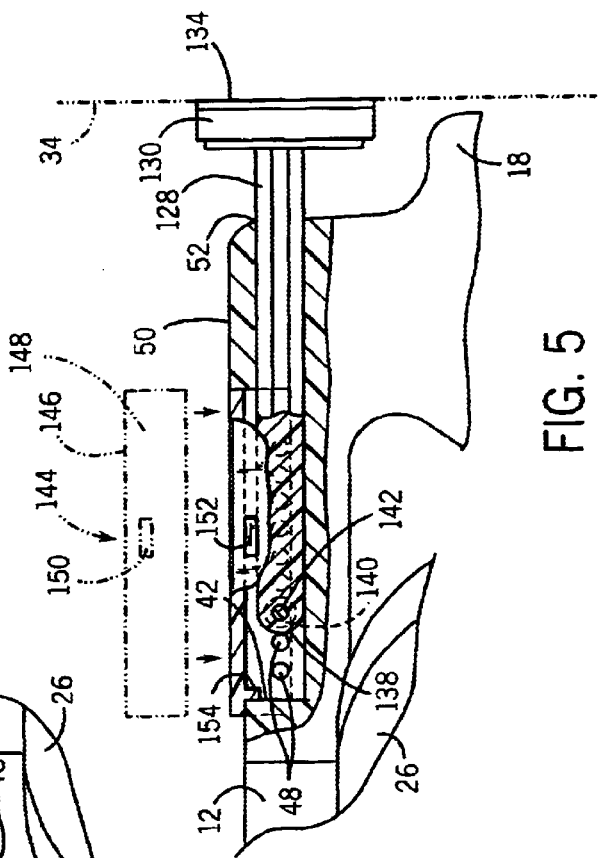
FIG. 4 is an enlarged partial side elevation view, with reference to line 4—4 of FIG. 2.

With reference now to the drawing figures in which like reference numerals designate like parts throughout the disclosure, a truck bed divider constructed according to the present invention is indicated generally at 10 in FIG. 1. The divider 10 is positioned within a truck bed 11 and is generally rectangular in shape, including a top rail 12, a bottom rail 14, and a pair of side rails 16 connecting the top and bottom rails. The side rails 16 each have an outwardly extending shoulder 18 positioned on each side rail 16 opposite the top rail 12 and bottom rail 14. The shoulders 18 define a hollow interior 19 and are preferably formed integrally with side rails 16, but can also be separately attached to the side rails 16. The top rail 12, bottom rail 14 and side rails 16 are each formed as a tube comprised of a lightweight, rigid material capable of handling a significant amount of stress. Examples of these types of materials include thermosetting plastics and metals. Preferably, the top rail 12 and bottom rail 14 are square tubes formed from anodized aluminum, and the side rails 16 and shoulders 18 are square tubes comprised of a glass-filled nylon.

The divider 10 also includes a center rail 20 spaced between and extending parallel to the top rail 12 and bottom rail 14, and secured to the side rails 16. The center rail 20 is formed similarly to the top rail 12 and bottom rail 14 and separates he divider 10 into an upper portion 22 and a lower portion 24.

Both the upper portion 22 and lower portion 24 include a pair of web sections 26 disposed between the top rail 12 and center rail 20, and center rail 20 and bottom rail 14, respectively. The web sections 26 prevent any items secured by the divider 10 from passing through the upper portion 22 or lower portion 24 of the divider 10. The web sections 26 are each formed of a flexible plastic material, such as a soft rubber or other resilient material, and include a number of apertures 28 in order to reduce the wind resistance of divider 10 as well as the overall weight of the divider. Further, the web sections 26 each include a support 29 located opposite the side rails 16 that extends perpendicularly between the top rail 12 or bottom rail 14 and the center rail 20 to maintain the web sections 26 in an upright position and to provide additional support to the divider 10.

The divider 10 further includes a number of feet 30 attached to the bottom rail 14 and extending outwardly from the divider 10 away from the top rail 12. The feet 30 are formed of a deformable, resilient material having a high coefficient of friction, such as a rubber, in order to allow the feet 30 to securely engage the truck bed 11 when the divider 10 is in use.

The truck bed 11 in which the divider 10 is located has a bottom wall 32 and a pair of opposed side walls 34 extending upwardly from the bottom wall 32. The divider 10 is positioned in the truck bed 11 such that the feet 30 engage the bottom wall 32, and the side rails 16 and shoulders 18 are located adjacent the side walls 34. In a typical application, divider 10 is positioned within truck bed 11 such that the wheel wells of truck bed 11 are located within the space below shoulders 18 and outwardly of side rails 16.

As best shown in FIGS. 3–9, the uppermost areas of side rails 16 further include a pair of mirror image channels 40 and 42 located adjacent opposite ends of the top rail 12 and aligned with top rail 12. Each of the channels 40, 42 is generally rectangular in shape and extends from the outermost end of the side rails 16 over each shoulder 18 inwardly towards the top rail 12. Each channel 40, 42 is defined by a pair of upwardly extending side walls 46. The side walls 46 each include a number of pairs of openings 48 that are aligned with one another along each side wall 46. Opposite the top rail 12, each channel 40, 42 is partially enclosed by a top wall 50 that extends across the channel 40, 42 between the side walls 46 to form a pair of passages 51 and 52 at the outermost end of end side rail 16 over each shoulder 18. The identical shape of each of the channels 40, 42 in each of the side rails 16 enables the divider 10 to be formed without the need for separate sets of tooling to form each of the channels 40, 42. This greatly reduces the cost of manufacturing the divider 10.

The channels 40, 42 are used to attach a pair of securing mechanisms 53 and 54 to the divider 10 in order to releasably secure the divider 10 between the side walls 34 of the truck bed 11.

As best shown in FIGS. 3, 4 and 6–9, the first securing mechanism 53 includes an elongate arm 56 that is slidably received within the first channel 40 through the passage 51. Outside of the passage 51, the arm 56 is fixed to a stop 58 having a flat surface 59 opposite the arm 56. The stop 58 can have any shape which includes-the surface 59, but is preferably square in shape. The arm 56 and stop 58 are each formed of a rigid material, such as a thermosetting plastic or metal that can withstand a significant amount of stress. The stop 58 can be fixed to the arm 56 by any conventional means, such as by an adhesive or a mechanical fastener. However, due to the properties of the thermosetting material that is preferably used to form the arm 56 and stop 58, the arm 56 and stop 58 are preferably integrally formed with one another.

Referring now to FIG. 8, the stop 58 also includes an outwardly extending flange 60, formed integrally with the stop 58, that is coplanar with the flat surface 59. The flange 60 is used to connect a pad 61 to the stop 58 opposite the arm 56. The pad 61 is formed of a soft, resilient material with a high coefficient of friction, such as a soft rubber, and engages the side wall 34 of the truck bed 11 when the first securing mechanism 53 is engaged. To secure the pad 61 over the flat surface 59 of the stop 58, the pad 61 includes a recess 62 having dimensions similar to the dimensions of the stop 58 and flange 60. The recess 62 further includes an inwardly extending lip 64 that overlies the outer edge of the recess 62 and conforms to the shape of the flange 60 on the stop 58. Thus, to attach the pad 61 to the stop 58, the lip 64 on the recess 62 is deflected so that the outwardly extending flange 60 and the stop 58 can be inserted into the recess 62. Once the flange 60 is completely inserted within the recess 62 beneath the lip 64, the lip 64 is released to overlie and retain the flange 60 and stop 58 in engagement with the pad 61.

The pad 61 also includes a number of protrusions or knobs 66 that extend outwardly from an engaging surface 65 on the pad 61 opposite the recess 62. When the first securing mechanism 53 is engaged, due to the properties of the material forming the pad 61, the knobs 66 contact and compress against the side wall 34 of the truck bed 11 to frictionally secure the pad 61 and first securing mechanism 53 to the side wall 34 without damaging the side wall 34.

Referring now to FIGS. 6–8, opposite the stop 58, the arm 56 includes a pair of outwardly extending tabs 68 that define a slot 70 therebetween. The tabs 68 include a pair of central openings 72 that are aligned with one another and used to pivotally secure a link 74 between the tabs 68. The link 74 is formed of a rigid material, such as a metal or thermosetting plastic, and includes a curved first end 76 having a first aperture 78 and a curved second end 80 including a second aperture 82. Between the first end 76 and second end 80, the link 74 further includes a flat upper surface 84 and a concave lower surface 86. The first end 76 of the link 74 is inserted into the slot 70 such that the central opening 72 in each tab 68 is aligned with the first aperture 78 in the first end 76. A rivet 88 or other suitable securing member is then inserted through the aligned opening 72 and aperture 78 and secured therein to pivotally secure the first end 76 of the link 74 to the arm 56.

Opposite the first end 76, the second end 80 of the link 74 is rotatably secured to a pivoting latch 90. The latch 90 is formed of a rigid material, similar to the arm 56 and link 74, and includes a lower locking portion 92 which is disposed within the channel 40, and an upper handle portion 94 that extends from the locking portion 92 out of the channel 40 and above the side rail 16.

The lower locking portion 92 has a curved rear end 96, a sloped front end 98 and a slot 99 located opposite the handle portion 94. The slot 99 has a height slightly less than that of the link 74 and extends between the front end 98 and the rear end 96, forming a pair of opposed flanges 100 that define a locking surface 101 therebetween.

Each of the flanges 100 includes a first hole 102 disposed in the rear curved end of each flange 100. The first holes 102 are alignable with the pairs of openings 48 in the side walls 46 of the channel 40. To pivotally secure the locking portion 92 within the first channel 40, after aligning the first holes 102 with the openings 48, a bolt 104 is inserted through the first holes 102 and a selected aligned pair of openings 48. The bolt 104 includes a head 106 at one end and a bore 108 that extends through the end of the bolt 104 opposite the head 106. The bolt 104 extends completely through the locking portion 92 and the side rail 12 such that head 106 engages one side wall 46 and the opposite end including the bore 108 extends through the opposite side wall 46. A cotter pin 110 or other suitable connector is releasably inserted through the bore 108 to releasably secure the bolt 104 within the respective openings 48 and 102 in order to pivotally secure the locking portion 92 within the first channel 40 on the side rail 16.

Each flange 100 of the locking portion 92 also includes a second hole 112 disposed adjacent the sloped end 98 and spaced from the first hole 102 that is used to pivotally secure the second end 80 of the link 74 to the locking portion 92. When the second end 80 of the link 74 is positioned within the slot 99 in the locking portion 92, the second opening 82 in the second end 80 is aligned with the second holes 112 in the flanges 100. A rivet 114 is inserted through the respective openings 82 and holes 112 to pivotally secure the second end 80 of the link 74 to the flanges 100 of the locking portion 92.

As best shown in FIG. 8, the locking portion 92 also includes a pair of wedges 116 extending outwardly from each flange 100 opposite the slot 99. The wedges 116 serve to properly position the locking portion 92 along the first channel 40 such that the first holes 102 in the flanges 100 are aligned with one of the pairs of openings 48 in the side walls 46 of the first channel 40. To align the locking portion 92, the wedges 116 are releasably engaged within pairs of opposed grooves 118 that are disposed between each pair of openings 48 on the side walls 46 within the first channel 40. When the wedges 116 engage one of the pairs of opposed grooves 118, the first holes 102 in the flanges 100 are properly aligned with a corresponding pair of openings 48 in the side walls 46.

Referring now to FIGS. 3, 4, 6 and 7, the handle portion 94 of the latch 90 includes a flat upper plate 120. The plate 120 has a narrow end 122 disposed over and connected to the locking portion 92 by a downwardly depending stem 123, and a flared end 124 extending from the narrow end 122 away from the top rail 12. The plate 120 extends outwardly from the stem 123 over the top wall 50 and to either side of the top rail 12 to cover the portion of the first channel 40 between the top wall 50 and the locking portion 92 when the first mechanism 53 is in the engaged position. The plate 120 also includes a pair of downwardly extending panels 126 located adjacent opposite sides of the flared end 124 that are spaced from one another a distance slightly greater than that of the width of side rail 16. When the first securing mechanism 53 is in the engaged position, the downwardly depending panels 126 cover each side of the side rail 16 to prevent any interference with the operation of the parts of the first securing mechanism 53.

Figure 5:
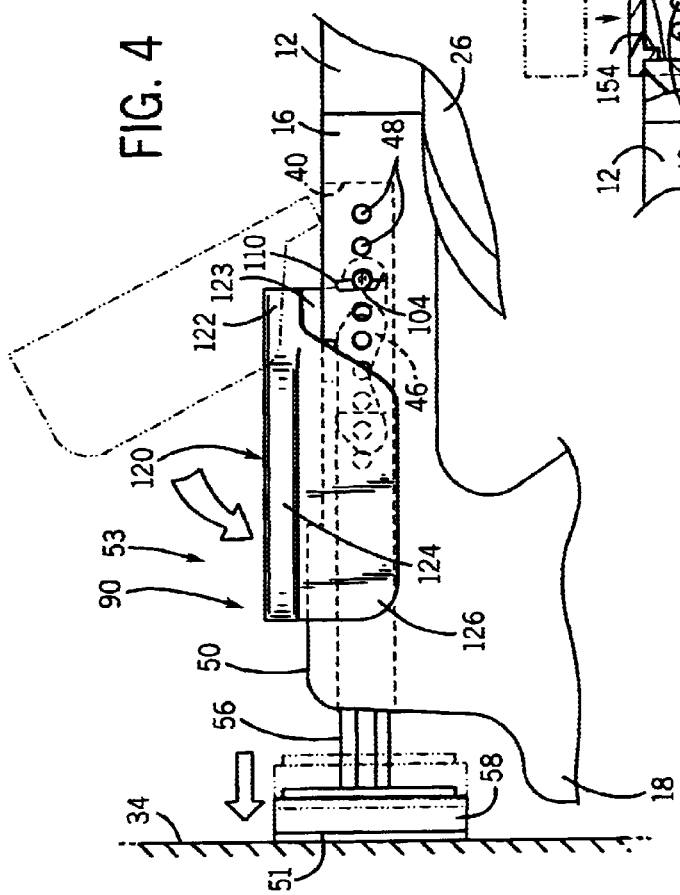
FIG. 5 is a partial cross-sectional view along line 5—5 of FIG. 1.

Referring now to FIG. 5, the second securing mechanism 54 is shown as including an arm 128 similar to the arm 56 of the first mechanism 53. At one end, the arm 128 includes a stop 130 having a flat surface (not shown) opposite the arm 128 and an outwardly extending flange (not shown) coplanar with the flat surface. The flange is releasably securable within a pad 134 in a manner identical to that disclosed with respect to the first mechanism 53. Further, the arm 128, stop 130 and pad 134 are all formed similarly to and using the same materials as specified for the corresponding parts of the first mechanism 53.

Opposite the stop 130, the arm 128 includes a curved end 138 that is slidably inserted through the passage 52 and retained within the channel 42 directly opposite the channel 40. The curved end 138 defines a bore 140 that is alignable with one of the pairs of openings 48 in the side walls 46 of the channel 42. A bolt 142 similar to bolt 104 can be inserted through the aligned openings 48 and bore 140 to adjustably secure the arm 128 within the second channel 42 in a manner similar to the use of the bolt 104 for the locking portion 92 of the latch 90.

The second securing mechanism 54 also includes a cover 144 that is releasably positionable over the second channel 42 between the top wall 50 and the side rail 16. The cover 144 is formed of a flexible, semi-rigid material and is generally U-shaped, having a flat central portion 146 and a pair of opposed downwardly depending side portions 148 extending from opposite ends of the central portion 146. Each side portion 148 includes a slot 150 spaced from the central portion 146 that releasably receives a tab 152 extending outwardly from each side wall 46 of the second channel 42. The central portion 146 includes a downwardly depending rib 154 adjacent one end of the central portion 146 that engages the side rail 16 at the inner end of the second channel 42 to properly position the cover 144 and slots 150 with respect to the second channel 42 and tabs 152, respectively.

To secure the divider 10 within the truck bed 32, first the curved end 138 of the arm 128 of the second securing mechanism 54 is slid through the passage 52 and into the second channel 42 until the bore 140 in the curved end 138 is aligned with the desired pair of openings 48 in the side walls 46 of the channel 42. The bolt 142 is then inserted through the respective opening 48 and bore 140 and releasably secured to retain the arm 128 and pad 134 in that position. The cover 144 is then secured over the top of the second channel 42 by deflecting the side portions 148 of the cover 144 and engaging the slots 150 with the respective tabs 152 on the side walls 46 of the second channel 42.

The latch 90, link 74 and arm 56 of the first mechanism 53 are then secured to one another and positioned within the channel 40, as described previously, and moved along the first channel 40 to position the first holes 102 in the latch 90 in alignment with the desired pair of openings 48 in the side walls 46 of the first channel 40. The bolt 104 is then inserted through the aligned openings 48 and holes 102 and releasably secured therein with the cotter pin 110 in order to retain the fist mechanism 53 in position with respect to the first channel 40 and the divider 10. The divider 10 is then placed within the truck bed 11 such that the feet 30 frictionally engage the bottom wall 32 and the pads 61 and 134 are positioned immediately adjacent each side wall 34.

Once the divider 10 is located in the desired position within the truck bed 11, the latch 90 is pivoted downwardly towards the side rail 16 into the closed or engaged position by grasping and pushing downwardly on the plate 120 of the handle portion 94 such that the link 74 and locking portion 92 are pressed downwardly into the first channel 40. The movement of the link 74 and locking portion 92 into the first channel 40 urges the arm 56 outwardly through the passage 51 to compress the stop 58 and pad 61 against the adjacent side wall 34 of the truck bed 11. The latch 90 is urged downwardly until the locking surface 101 within the slot 99 contacts the flat upper surface 86 of the link 74 and forces the link 74 completely into the interior of the channel 40. The engagement of the locking surface 101 and upper surface 86 creates an over-center engagement between the latch 90 and link 74 of the first mechanism 53 that holds the mechanism 53 in the engaged position and helps to prevent any inadvertent disengagement of the first mechanism 53. The engagement of the pad 61 with the adjacent side wall 34 also serves to shift the divider 10 laterally within the truck bed 11 and move the opposite pad 134 into engagement with the opposite side wall 34 to secure the divider 10 within the truck bed 11.

To remove the divider 10 and adjust the position of the first mechanism 53 or second mechanism 54 on the divider 10, the handle portion 94 of the latch 90 is grasped and pivoted in a direction away from the side rail 16 to retract the arm 56, stop 58 and pad 61 away from the adjacent side wall 34 and towards the side rail 16. The disengagement of the pad 61 from the adjacent side wall 34 also disengages the opposite pad 134 from the opposite side wall 34. The divider 10 can then be removed from or repositioned within the truck bed 11, and the first securing mechanism 53 and second securing mechanism 54 can be adjusted within the first channel 40 and second channel 42, respectively, to change the distance between the respective pads 61 and 134 and the-side walls 34 and enable the divider 10 to conform the length between the side walls 34 of the particular truck bed 11.

The preceding detailed description and drawing figures illustrate only the best mode currently contemplated of implementing the present invention, and are not intended to limit the scope of the present invention. For example, the divider 10 could be equipped with only the first securing mechanism 53 and a stationary pad disposed in place of the second mechanism 54. Further, the divider 10 could include a first securing mechanism 53 at each end of the divider 10 to enable the divider 10 to be used in an even wider range of truck beds 11.

The components of the individual mechanisms 53 and 54 can also be altered. More specifically, the arms 56 and 128 incorporated in each mechanism 53 and 54 can be lengthened to increase the overall effective length of the divider. Further, the openings 48 in the channels 40 and 42 used to adjust the position of the mechanisms 53 and 54 can be replaced by sloped or curved slots extending downwardly along the inner surfaces of each channel 40 and 42. The bolts 104 and 142 securing the latch 90 and arm 120 to the side walls 46 can then be slidably inserted into the slots which will retain the bolts 104 and 142 without the need for a cotter pin 110 or other connector while allowing the link 74 and latch 90 to pivot with respect to the side rail 16.

Finally, the securing latch mechanisms 53 and 54 of the present invention can be incorporated with other types of dividers having a variety of constructions other than that disclosed above.

Various alternative embodiments are contemplated as being within the scope of the following claims particularly pointing out and distinctly claiming the subject matter regarded as the invention.

I claim:

1. A truck bed divider for use with a truck bed including a bottom wall and a pair of opposed side walls extending upwardly from the bottom wall, the divider comprising:

a panel having a top rail, a bottom rail, and a pair of opposed side rails joining the top rail and the bottom rail; and a first adjustable latch mechanism secured to the panel and adapted to releasably engage a side wall of the truck bed, the first mechanism including a first stop adapted to engage one side wall of the truck bed, a first extension member extending from one side of the first stop, and a first handle pivotally secured to the first extension member opposite the first stop at a first point on the first handle, and pivotally and adjustably secured to the panel at a second point on the first handle spaced from the first point.

2. The divider of claim 1 further comprising a second adjustable latch mechanism attached to the panel opposite the first mechanism and adapted to releasably engage the other side wall of the truck bed, the second mechanism including a second stop adapted to engage the other side wall of the truck bed and a second extension member extending from one side of the second stop that is adjustably secured to the panel opposite the second stop.

3. The divider of claim 2 wherein the second mechanism further comprises a second handle pivotally secured to the second extension member opposite the second stop at a first point on the second handle, and pivotally and adjustably secured to the panel at a second point on the second handle spaced from the first point of the second handle.

4. The divider of claim 1 wherein the first extension member further comprises:

an arm secured to the first stop; and a link pivotally secured to the arm opposite the first stop at one end and pivotally secured to the first handle at the first point on the first handle at the opposite end.

5. The divider of claim 1 wherein the first handle is attached to the top rail of the panel.

6. The divider of claim 1 wherein the first handle is attached to one of the side rails of the panel.

7. The divider of claim 1 wherein the first stop includes a pad secured to the first stop opposite the first extension member.

8. The divider of claim 7 wherein the pad is formed of a flexible, resilient material.

9. The divider of claim 8 wherein the flexible, resilient material has a high coefficient of friction.

10. The divider of claim 1 wherein the opposed side rails are identical in shape.

11. A divider for use in the cargo area of a vehicle, wherein the cargo area is defined between a pair of side surfaces, comprising:

a divider member defining spaced first and second ends;

a stationary first engagement member secured to the first end of the divider member;

an extendible and retractable second engagement member mounted to the second end of the divider member; and a movable operating mechanism interconnecting the divider member and the second engagement member for selectively extending and retracting the second engagement member between respective engaged and disengaged positions relative to the second end of the divider member, wherein the movable operating mechanism is interconnected with the second end of the divider member via a variable position mounting arrangement for varying the degree of extension of the second engagement member relative to the second end of the divider member when the movable operating mechanism is positioned so as to place the second engagement member in its engaged position, and wherein the movable operating mechanism comprises a latch handle pivotably mounted relative to the divider member for movement about a first pivot axis, wherein the variable position mounting arrangement comprises a pivot member engageable within a selected opening of a series of openings in the divider member, wherein the pivot member defines the first pivot axis for providing pivoting movement of the latch handle.

12. The divider of claim 11 wherein the movable operating mechanism further comprises a link pivotably interconnected with both the latch handle and the second engagement member for imparting axial movement of the second engagement member relative to the divider member upon pivoting movement of the latch handle.

13. The divider of claim 12 wherein the second engagement member is received within an axially extending passage defined by the divider member for guiding movement of the second engagement member between its engaged and disengaged positions.

14. The divider of claim 11, further comprising a variable position engagement arrangement interposed between the divider member and the stationary first engagement member for varying the position of the first engagement member relative to the divider member.

\* \* \* \* \*